United States Patent
Kim

(10) Patent No.: US 11,003,136 B2
(45) Date of Patent: May 11, 2021

(54) APPARATUS AND METHOD FOR GENERATING HOLOGRAM BASED ON HUMAN VISUAL SYSTEM MODELING

(71) Applicant: Electronics and Telecommunications Research Institute, Daejeon (KR)

(72) Inventor: Tae One Kim, Sejong-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 296 days.

(21) Appl. No.: 16/195,492

(22) Filed: Nov. 19, 2018

(65) Prior Publication Data
US 2019/0163133 A1 May 30, 2019

(30) Foreign Application Priority Data
Nov. 30, 2017 (KR) .......................... 10-2017-0163499

(51) Int. Cl.
G03H 1/08 (2006.01)
G03H 1/04 (2006.01)
G03H 1/02 (2006.01)

(52) U.S. Cl.
CPC ............. *G03H 1/0866* (2013.01); *G03H 1/02* (2013.01); *G03H 1/0443* (2013.01);
(Continued)

(58) Field of Classification Search
CPC ...... G03H 1/0866; G03H 1/0443; G03H 1/02; G03H 2001/0452; G03H 2226/02;
(Continued)

(56) References Cited

U.S. PATENT DOCUMENTS

2014/0300941 A1* 10/2014 Chang .................. G03H 1/0808
359/9
2015/0036199 A1 2/2015 Leister et al.
(Continued)

FOREIGN PATENT DOCUMENTS

KR 101328564 B1 11/2013
KR 1020170111135 A 10/2017

OTHER PUBLICATIONS

Yan Zhao et al., "Accurate calculation of computer-generated holograms using angular-spectrum layer-oriented method", Oct. 5, 2015, pp. 25449, vol. 23, No. 20, Optics Express, Tsinghua University, Beijing, China.

*Primary Examiner* — Jade R Chwasz
(74) *Attorney, Agent, or Firm* — William Park & Associates Ltd.

(57) ABSTRACT

In the present invention, by providing an apparatus for generating a hologram based on human visual system modeling, including a lens configured to focus light emitted from a three-dimensional (3D) object, a sensor configured to detect the light, an object information obtaining unit configured to obtain object information of the 3D object based on information of the lens and a confusion circle size threshold value corresponding to information of the sensor, and a hologram image generating unit configured to generate a hologram image for the 3D object based on the object information, it is possible to provide a method of generating a hologram based on a human visual system capable of generating image information of a three-dimensional object faster and capable of generating a higher-quality hologram image.

17 Claims, 7 Drawing Sheets

(52) U.S. Cl.
CPC ............. *G03H 2001/0216* (2013.01); *G03H 2001/0452* (2013.01); *G03H 2210/30* (2013.01); *G03H 2210/44* (2013.01); *G03H 2226/02* (2013.01)

(58) Field of Classification Search
CPC ....... G03H 2210/30; G03H 2001/0216; G03H 2210/44; G03H 1/2294; G03H 1/0808; G03H 1/2202; G03H 2001/0825; G03H 1/0891
USPC .......................................................... 359/9
See application file for complete search history.

(56) References Cited

U.S. PATENT DOCUMENTS

2015/0097925 A1   4/2015  Choo et al.
2016/0004923 A1*  1/2016  Piekniewski ...... G02B 27/0075
                                                            348/302

* cited by examiner

APPARATUS AND METHOD FOR GENERATING HOLOGRAM BASED ON HUMAN VISUAL SYSTEM MODELING

CROSS-REFERENCE TO RELATED APPLICATION

This application claims priority to and the benefit of Korean Patent Application No. 10-2017-0163499 filed in the Korean Intellectual Property Office on Nov. 30, 2017, the entire contents of which are incorporated herein by reference.

BACKGROUND OF THE INVENTION (a) Field of the Invention

The present invention relates to an apparatus and a method for generating a hologram by modeling a human visual system.

(b) Description of the Related Art

The holography technique is the ultimate 3D stereoscopic image reconstruction technique which can reproduce a 3D object in a space, provide a natural 3D sensation to the observer, and fundamentally solve the limitation of the stereoscopic image generated in the conventional stereoscopic method.

In recent years, digital holography technology has attracted attention with the development of display technology as a technology capable of reproducing three-dimensional images.

Particularly, the digital holography technique obtains object information on a three-dimensional object using an optoelectronic device and a computer, generates a computer-generated hologram (hereinafter referred to as "CGH"), and then reproduces a stereoscopic image corresponding to the 3D object so that it is displayed to an observer as if it exists in three-dimensional space using an optical display device.

Such holographic-based display technology can be roughly classified into a light control technique, a spatial light modulation (SLM) technique, a hologram obtaining technique, and a hologram reproduction technique. Among them, the hologram obtaining technique obtains object information about a three-dimensional object.

The hologram obtaining technique has been developed together with the development of digital holography technology, and is characterized by performing computer signal processing on object information on three-dimensional objects using computer graphics (CG).

CGH technology obtains three-dimensional image information including object information (depth information and color information (RGB)) and point cloud as an input, and generates a hologram image. Examples of representative CGH techniques include point-based CGH technology, plane-based CGH technology, mesh-based CGH technology, and multi-view based CGH technology.

Particularly, the plane-based CGH technique divides a three-dimensional object into N depth-quantized planes having N depth levels to generate a hologram image (in this case, usually a three-dimensional object, wherein the depth information can be set to N=256 when 8-bit information is expressed, and the value of N to be described later is expressed as 256), and a technique of obtaining color information for a three-dimensional object on each quantization depth plane. Wave propagation from the 256 quantization depth planes to the hologram plane can be calculated using a fast Fourier transform (FFT) scheme.

The above method divides a 3D object into 256 quantization depth planes having the same interval between the nearest position (depth_min) and the farthest position (depth_max). Accordingly, the above-described method has a disadvantage in that it takes a considerable amount of calculation time because the FFT calculation process must be performed 256 times in order to analyze a three-dimensional object.

When the number of quantization depth planes is simply reduced, there is a disadvantage that the image quality of the holographic image is significantly degraded as compared with the case of analyzing a three-dimensional object with 256 quantization depth planes.

This work was supported by Institute for Information & communications Technology Promotion (IITP) grant funded by the Korea government (MSIP) (No. 2017-0-00417-002, Openholo library technology development for digital holographic contents and simulation)

SUMMARY OF THE INVENTION

Embodiments of the present invention are provided to solve the problem of increasing the speed of obtaining an image of a three-dimensional object before generating the hologram image while maintaining or improving the image quality of the hologram image by providing a hologram generating apparatus based on human visual system modeling.

An exemplary embodiment of the present invention provides an apparatus for generating a hologram based on human visual system modeling, including: a lens configured to focus light emitted from a three-dimensional (3D) object; a sensor configured to detect the light; an object information obtaining unit configured to obtain object information of the 3D object based on information of the lens and a confusion circle size threshold value corresponding to information of the sensor; and a hologram image generating unit configured to generate a hologram image for the 3D object based on the object information.

The object information obtaining unit determines positions of a plurality of planes passing through the three-dimensional object based on the confusion circle size threshold value, and obtains the object information of each of the plurality of planes.

The object information obtaining unit determines a position of a first plane based on the position of the 3D object, determines a first focal length of a lens corresponding to the position of the first plane, and determines a position of at least one second plane that is different from the first plane based on the focal length and the confusion circle size threshold value.

An interval between the plurality of planes is proportional to a distance from the lens to the plurality of planes.

The object information obtaining unit determines the first focal length using the following Equation 1, wherein Equation 1 is $f(eye)=1/(1/d(o,i)+1/d(2))$, where $f_{(eye)}$ is a first focal length, $d_{(o,i)}$ is a distance between the first plane and the lens, and $d_2$ is a distance between the lens and the sensor.

The object information obtaining unit determines a threshold value of a lens-to-image distance which is a distance between the lens and the image generated by the lens based on the threshold value of the confusion circle size, and determines the position of the second plane based on the first focal length and the threshold value of the lens-to-image distance.

The object information obtaining unit determines the threshold value of lens-to-image distance by using the following Equation 2, wherein Equation 2 is d(i)=2*d2*A/(ΔX+2*A), where $d_{(i)}$ is a threshold value of the lens-to-image distance, $d_2$ is a distance between the lens and the sensor, A is the radius of the lens, and Δx is the confusion circle size threshold value.

The object information obtaining unit determines the position of the second plane based on the first focal length and the threshold value of the lens-to-image distance.

The object information obtaining unit determines the position of the second plane using the following Equation 3, wherein Equation 3 is DeletedTexts, where $d_{(o,i+1)}$ is distance between the i-th surface and the lens, $f_{(eye)}$ is a focal length of the i-th surface, and $d_{(i)}$ is a threshold value of the lens-to-image distance.

The number of the plurality of planes is 256 or less.

An exemplary embodiment of the present invention provides a method for generating a hologram based on human visual system modeling, including: focusing light emitted from a three-dimensional object; detecting the light; determining a confusion circle size threshold value corresponding to information of a sensor detecting the light and information of a lens focusing the light; determining a position of a plurality of planes passing through the three-dimensional object based on the confusion circle size threshold value; obtaining object information of the three-dimensional object of each of the plurality of planes; and generating a hologram image of the three-dimensional object based on the object information.

The determining the position of the plurality of planes includes: determining a position of the first plane based on the position of the three-dimensional object; determining a first focal length of the lens corresponding to the position of the first plane; and determining a position of at least one second plane that is different from the first plane based on the first focal length and the confusion circle size threshold value.

The determining the position of the at least one second plane includes: determining interval between the at least one second plane which is proportional to a distance from the lens to each second plane based on the confusion circle size threshold value, and determining the position of the at least one second plane based on the first focal length and the interval between the at least one second plane.

The determining the first focal length includes: determining the first focal length using following Equation 1, wherein Equation 1 is f(eye)=1/(1/d(o,i)+1/d(2)), where $f_{(eye)}$ is a first focal length, $d_{(o,i)}$ is a distance between the first plane and the lens, and $d_{(2)}$ is a distance between the lens and the sensor.

The determining the position of the at least one second plane based on the first focal length and the interval between the at least one second plane includes: determining a threshold value of the lens-to-image distance which is a distance between the lens and the image generated by the lens based on the confusion circle size threshold value, and determining the position of the second plane based on the first focal length and the threshold value of the lens-to-image distance.

The determining the threshold value of the lens-to-image distance includes: determining the threshold value of the lens-to-image distance using the following Equation 2, wherein Equation 2 is d(i)=2*d2*A/(ΔX+2*A), where $d_{(i)}$ s a threshold value of the lens-to-image distance, $d_0$ is a distance between the lens and the sensor, A is the radius of the lens, and Δx is the confusion circle size threshold value.

The determining the position of the second plane based on the first focal length and the threshold value of the lens-to-image distance includes: determining a position of the at least one second plane using the following Equation 3, wherein Equation 3 is DeletedTexts, where $d_{(o,i+1)}$ is a distance between the i-th surface and the lens, $f_{(eye)}$ is a focal length of the i-th surface, and $d_{(i)}$ is a threshold value of the lens-to-image.

An exemplary embodiment of the present invention provides an apparatus for generating a hologram based on human visual system modeling, including: a lens configured to focus light emitted from a three-dimensional object; a sensor configured to detect the light; an object information obtaining unit configured to determine a confusion circle size threshold value corresponding to information of the sensor and information of the lens, determine a position of the three-dimensional object closest to the lens as a position of a first plane, determine a first focal length of the lens corresponding to the position of the first plane, determine a position of at least one second plane that is different from the first plane based on the first focal length and the confusion circle size threshold value, and obtain object information of the three-s dimensional object of each of the first plane and the at least one second plane; and a hologram image generating unit configured to generate a hologram image of the three-dimensional object based on the object information.

The object information obtaining unit determines interval between the at least one second plane which is proportional to a distance from the lens to each of the second planes based on the confusion circle size threshold value, and determines the position of the at least one second plane based on the first focal length and the interval between the at least one second plane.

The object information obtaining unit determines a threshold value of the lens-to-image distance which is a distance between the lens and the image generated by the lens based on the confusion circle size threshold value, and determines the position of the second plane based on the first focal length and the threshold value of the lens-to-image distance.

According to the embodiments of the present invention, the concept of depth of field based on modeling of the human visual system is utilized, and thus the image information for the three-dimensional object can be acquired more quickly.

In addition, according to the embodiments of the present invention, a hologram generating method that is capable of generating a hologram image of higher image quality can be provided by using the concept of depth of field based on modeling of a human visual system.

DETAILED DESCRIPTION OF THE EMBODIMENTS

Figure 1:
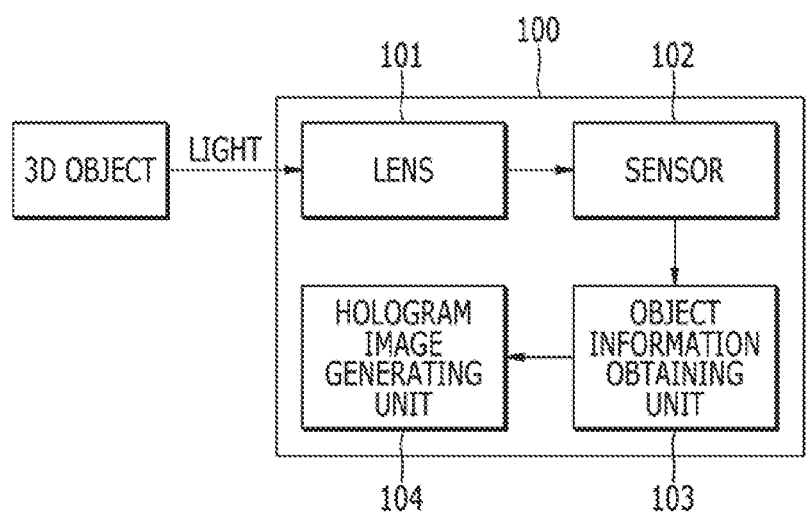
FIG. 1 shows a hologram generating apparatus according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive, and like reference numerals designate like elements throughout the specification.

FIG. 1 shows a hologram generating apparatus according to an embodiment of the present invention.

As shown in FIG. 1, the hologram generating apparatus 100 includes a lens 101 for focusing light emitted from a three-dimensional object to a focal point, a sensor 102 for detecting light focused by the lens 101, an object information obtaining unit 103 for obtaining object information of the three-dimensional object using the light detected by the object information obtaining unit 103, and a hologram image generating unit 104 for generating a hologram image based on the object information obtained by the object information obtaining unit 103.

The lens 101 may have a focal length for a specific plane located at a specific distance on a three-dimensional object. In this document, the focal length for a specific plane is defined as $f_{eye}$. The lens 101 may be manufactured to have a constant size, and in this document, the radius of the lens 101 is defined as A. The lens 101 can focus the light in the form of an image at a specific position, and the distance between the position where the image is formed and the lens in this document is defined as the lens-to-image distance.

The sensor 102 may be spaced a certain distance from the lens 101, and in this document the distance between the sensor 102 and the lens 101 is defined as $d_2$. A minimum size distinguished by the sensor 102 can be defined as a threshold value of the confusion circle size. In this document, the threshold value of the confusion circle size can be defined as $\Delta x$.

The object information obtaining unit 103 may obtain object information including depth information and color information from the light detected by the sensor 102, and a detailed description of the object information obtaining unit 103 will be given with reference to FIG. 2.

The hologram image generating unit 104 may generate a hologram image corresponding to the three-dimensional object using the object information obtained by the object information obtaining unit 103 and transmit the generated hologram image to a hologram reproducing apparatus (not shown).

Figure 2:
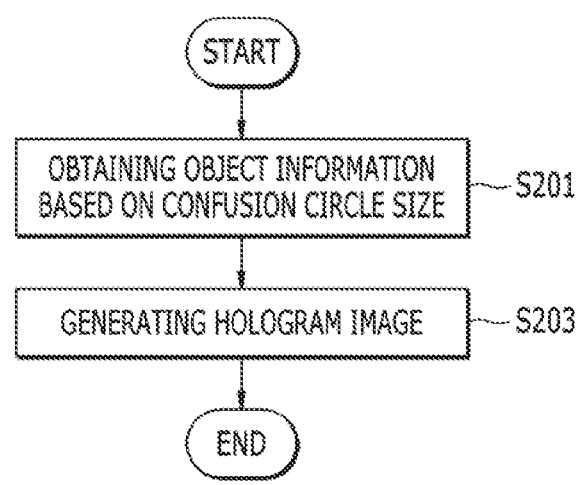
FIG. 2 shows a flowchart illustrating a method of generating a hologram in the hologram generating apparatus according to an embodiment of the present invention.

FIG. 2 shows a flowchart illustrating a method of generating a hologram in the hologram generating apparatus according to an embodiment of the present invention.

As shown in FIG. 2, the hologram generating method includes obtaining at least one piece of object information based on a confusion circle size (S201), and generating a hologram image corresponding to the three-dimensional object based on the object information (S203).

The object information obtaining unit (e.g., the object information obtaining unit 103 in FIG. 1) of the hologram producing apparatus (e.g., the hologram producing apparatus 100 in FIG. 1) may obtain at least one piece of object information using light detected by the sensor (e.g., the sensor 102 of FIG. 1), based on a confusion circle size corresponding to information about the lens and information about the sensor. For example, the information on the lens may include lens size information and refractive index information, and the information on the sensor may include, but is not limited to, the distance between the lens and the sensor, and the resolution information of the sensor.

Step S201 will be described in detail with reference to FIG. 3 to FIG. 7.

The hologram image generation unit 104 of the hologram image generation apparatus 100 generates the hologram image corresponding to the three-dimensional object based on the object information obtained by the object information obtaining unit 103.

Hereinafter, with reference to FIG. 3 to FIG. 7, a procedure for obtaining object information for a three-dimensional object in a hologram generating method according to an embodiment of the present invention will be described in detail.

Figure 3:
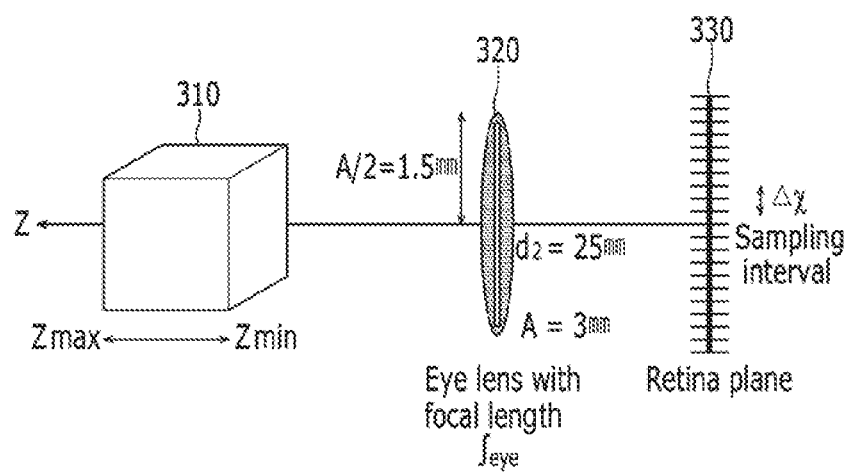
FIG. 3 shows a conceptual diagram of a hologram generating apparatus according to an embodiment of the present invention.

FIG. 3 shows a conceptual diagram of a hologram generating apparatus according to an embodiment of the present invention.

As shown in FIG. 3, the hologram generating apparatus (e.g., the hologram generating apparatus 100 of FIG. 1) may include a lens 320 and a sensor 330.

The lens 320 may focus the light emitted from the three-dimensional object 310 located between $Z_{min}$ and $Z_{max}$ onto the sensor 330. In order to correspond to the human visual modeling system, the diameter (A/2) of the lens 320 can be set to 3 mm, which is an average value of the size of the pupil of the human eye. The focal length $f_{eye}$ of the lens 320 can be changed according to the depth of the three-dimensional object, like a human eye.

The distance $d_2$ between the lens 320 and the sensor 330 can be set to 25 mm, which is an average value of the distance between the human eye and the human retina plane. In order to correspond to the human visual modeling system, the threshold value $\Delta x$ of the size of the confusion circle of the sensor 330 can be set to a threshold value of the confusion circle size of the human eye. The position of each plane passing through the three-dimensional object or the interval between each plane can be determined according to the threshold value of the magnitude of the confusion circle of the sensor 330.

Figure 4:
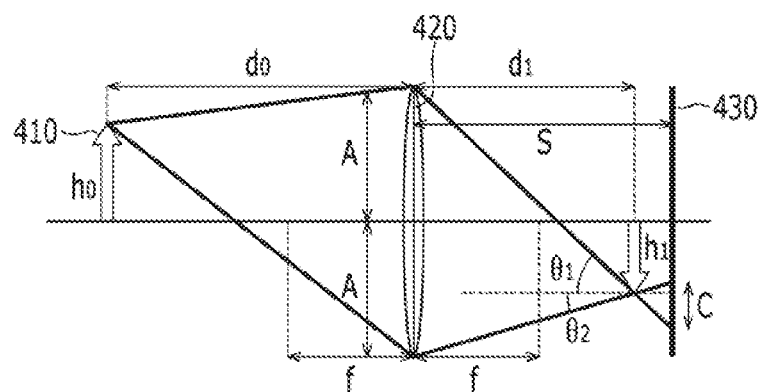
FIG. 4 shows a conceptual diagram of a hologram generating apparatus according to an embodiment of the present invention.

FIG. 4 shows a conceptual diagram of a hologram generating apparatus according to an embodiment of the present invention.

As shown in FIG. 4, the light emitted from a three-dimensional object 410 (h0) spaced by d0 from a lens 420 is focused at a position spaced away by d1 from the lens 420, after passing through the lens 420 and being refracted, and is detected by a sensor 430 spaced away by S from the lens 420.

The threshold value of the size of the confusion circle of the sensor 430 may correspond to the threshold value C of the confusion circle size of the human eye.

The threshold value C of the confusion circle size can be calculated using the following Equation 1.

$$C = 2*(S - d(i))*A/d(i) \qquad \text{[Equation 1]}$$

(C is the threshold value of the confusion circle size, S is the average value of the distance between the human pupil and the retina, $d_{(i)}$ is the threshold value of the distance between the pupil and the image $h_o$, and A is the average value of the pupil radius)

If the radius of the lens 420 is defined as an average value of the radius of the pupil, the distance between the lens 420 and the sensor 430 is defined as an average value of the distance between the pupil and the retina, and the threshold value C of the confusion circle size is set as the confusion circle size threshold value Δx of the sensor 430, Equation 1 can be substituted for the threshold value of the distance between the lens 420 and the image, and the following Equation 2 is obtained.

$$d(i)=2*d2*A/(\Delta X+2*A) \qquad \text{[Equation 2]}$$

($d_{(i)}$ is the distance between the lens 420 and the sensor 430, A is the radius of the pupil, and ax is the size of the confusion circle)

The object information obtaining unit 103 may determine a position of a certain first plane and then determine a position of a second plane spaced apart from the first plane, and a position of a third plane spaced apart from the second plane and a position of an (i+1)-th plane spaced apart from an i-th plane can be determined as follows. For example, the object information obtaining unit 103 may determine a position ($Z_{min}$) closest to the lens 420 on the three-dimensional object 310 as an initial $z_1$ position of the first plane. For example, the object information obtaining unit 103 determines an i-th focal length ($f_{eye}$) corresponding to the i-th plane based on a distance $d_{(o,i)}$ between the i-th plane and the lens (420) and a distance $d_2$ between the lens (420) and the sensor (430), using Equation 3 below.

$$f(\text{eye})=1/(1/(d(o,i))+1/(d2)) \qquad \text{[Equation 3]}$$

($f_{(eye)}$ is the i-th focal length, $d_{(o,i)}$ is the distance between the i-th plane and the lens 420, and $d_{(2)}$ is the distance between the lens 420 and the sensor 430)

The object information obtaining unit 103 determines the distance between the i-th plane and the lens 420 based on the i-th focal length and the threshold value $d_i$ of the distance between the lens 420 and the image $h_o$, using Equation 4.

$$d(o,i+1)=1/(1/f(\text{eye})-1/d(i)) \qquad \text{[Equation 4]}$$

($d_{(o,i+1)}$ is the distance between the (i+1)-th plane and the lens 420, $f_{(eye)}$ is the i-th focal length, and $d_{(i)}$ is the threshold value of the distance between the lens 420 and the image $h_o$)

The object information obtaining unit 103 repeats Equations 3 and 4 until the distance between the M-th plane and the lens 420 being larger than the maximum distance $Z_{max}$ of the three-dimensional object 310. When the distance between the M-th plane and the lens 420 is larger than the minimum distance $Z_{max}$ of the three-dimensional object 310, the object information obtaining unit 103 obtains color information of each of the three-dimensional object on the M planes from the first plane to the M-th plane passing through the three-dimensional object (310).

The hologram image generating unit 104 may generate the hologram image based on the color information of the three-dimensional object corresponding to each of the M planes.

Figure 5:
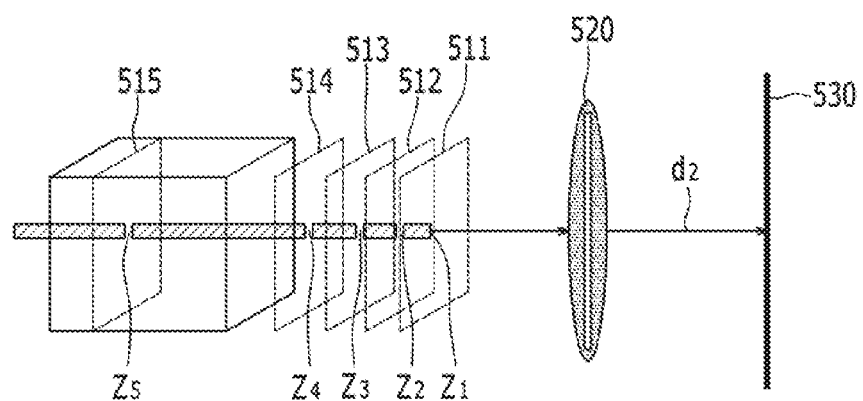
FIG. 5 shows depth of field for a three-dimensional object according to an embodiment of the present invention.

FIG. 5 shows depth of field for a three-dimensional object according to an embodiment of the present invention.

As shown in FIG. 5, according to the embodiment of the present invention, the depth of field corresponding to a fifth plane 515 passing through a three-dimensional object 510 and located at Z5 (DoF of Z5) is larger than the depth of field corresponding to a fourth plane 514 located at Z4 that is closer to a lens 520 than Z5 (DoF of Z4). Similarly, the depth of field corresponding to the fourth plane 514 located at Z4 (DoF at Z4) is larger than the depth of field corresponding to a third plane 513 located at Z3 that is closer to the lens 520 than Z4.

As the plane is closer to the lens 520, the depth of field corresponding to the plane may be narrower. Conversely, the farther the plane is from the lens 520, the deeper the depth of field corresponding to the plane.

In this way, when determining at least one plane for analyzing the three-dimensional object 510, it is possible to determine the plane except for planes having the object information of a difference that cannot be distinguished by the human eye.

Figure 6:
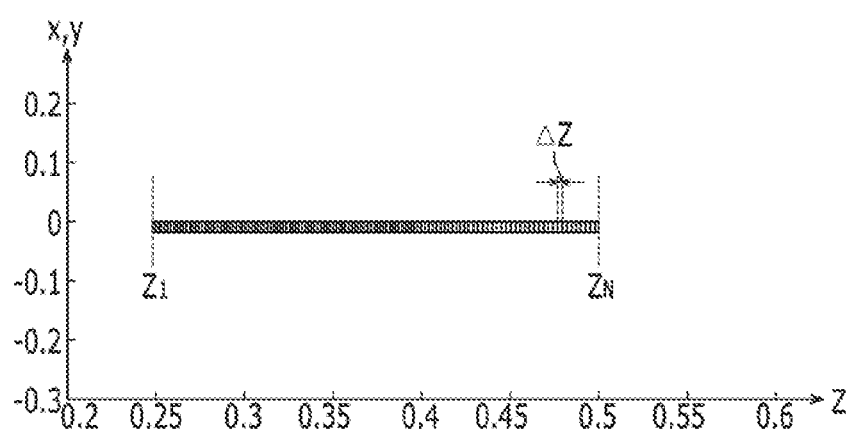
FIG. 6 shows a graph illustrating depth of field according to an embodiment of the present invention.

FIG. 6 shows a graph illustrating depth of field according to an embodiment of the present invention.

As shown in FIG. 6, according to the embodiment of the present invention, when the depth of field at each position between Z1 and ZN is analyzed by the hologram generating method, as the distance from Z1 to ZN is further from the lens, the distance between the respective planes becomes longer.

Figure 7:
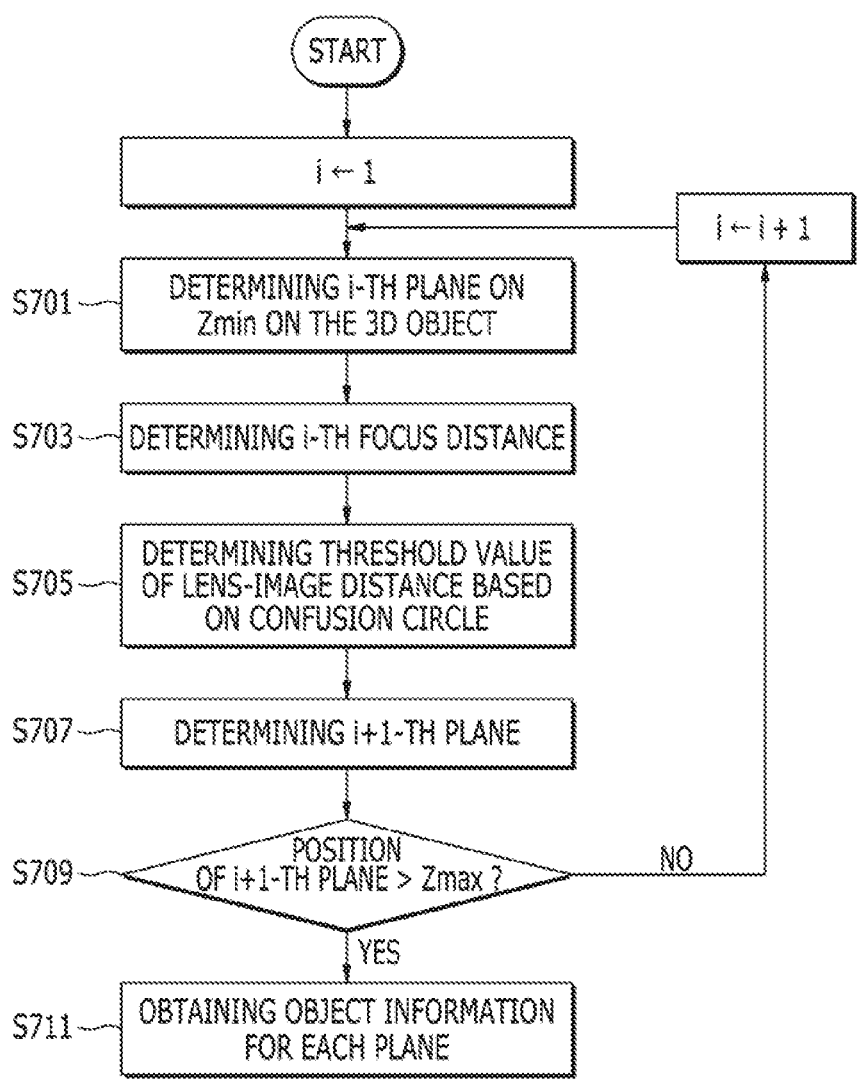
FIG. 7 shows an object information obtaining procedure according to an embodiment of the present invention.

FIG. 7 shows an object information obtaining procedure according to an embodiment of the present invention.

As shown in FIG. 7, the object information obtaining method according to the embodiment of the present invention includes setting i=1, determining a specific position of the three-dimensional object as the position of the i-th plane (S701), determining an i-th focal length corresponding to the i-th plane (S703), determining a threshold value of the distance between the lens and the image based on the confusion circle size threshold (S705), determining the position of the (i+1)-th plane (S707), determining whether the position of the (i+1)-th plane is larger than $Z_{max}$, and obtaining object information for each at least one plane according to a determination result (S711).

In step S701, the position of the i-th plane may be $Z_{min}$, that is, a point closest to the lens in the three-dimensional object.

In step S703, the i-th focal length corresponding to the i-th plane may be determined by the above-described Equation 3.

In step S705, the threshold value of the distance between the lens and the image can be determined by the above-described Equation 2.

In step S707, the position of the (i+1)-th plane may be determined by Equation 4.

While the present invention has been particularly shown and described with reference to exemplary embodiments thereof, it is to be understood that the invention is not limited to the disclosed exemplary embodiments, but, on the contrary, is intended to cover various modifications and equivalent arrangements included within the spirit and scope of the appended claims.

What is claimed is:

1. An apparatus for generating a hologram based on human visual system modeling, comprising:
   a lens configured to focus light emitted from a three-dimensional (3D) object;
   a sensor configured to detect the light; and
   one or more processors that process computer executable program code embodied in non-transitory computer readable storage media, the computer executable program code comprising:
   object information obtaining program code that obtains object information of the 3D object based on information of the lens and a confusion circle size threshold value corresponding to information of the sensor; and hologram image generating program code that generates a hologram image for the 3D object based on the object information, wherein the object information obtaining program code determines positions of a plurality of planes passing through the three-dimensional object based on the confusion circle size threshold value, and obtains the object information of each of the plurality of planes, and wherein the object information obtaining program code determines a position of a first plane based on the position of the 3D object, determines a first focal length of a lens corresponding to the position of the first plane, and determines a position of at least one second plane that is different from the first plane based on the focal length and the confusion circle size threshold value.

2. The apparatus of claim 1, wherein an interval between the plurality of planes is proportional to a distance from the lens to the plurality of planes.

3. The apparatus of claim 1, wherein the object information obtaining program code determines the first focal length using the following Equation 1:

$$f_{(eye)}=1/(1/d_{(o,i)}+1d_{(2)})$$ [Equation 1]

$f_{(eye)}$: first focal length,
$d_{(o,i)}$: distance between the first plane and the lens,
$d_{(2)}$: distance between the lens and the sensor).

4. The apparatus of claim 1, wherein the object information obtaining program code determines a threshold value of a lens-to-image distance which is a distance between the lens and the image generated by the lens based on the threshold value of the confusion circle size, and determines the position of the second plane based on the first focal length and the threshold value of the lens-to-image distance.

5. The apparatus of claim 4, wherein the object information obtaining program code determines the threshold value of the lens-to-image distance by using the following Equation 2:

$$d_{(i)}=2*d_{(2)}*A/(\Delta x+2*A)$$ [Equation 2]

($d_{(i)}$ threshold value of lens-to-image distance,
$d_{(2)}$: distance between the lens and the sensor,
A: radius of the lens,
$\Delta x$ confusion circle size threshold value).

6. The apparatus of claim 4, wherein the object information obtaining program code determines the position of the second plane based on the first focal length and the threshold value of lens-to-image distance.

7. The apparatus of claim 6, wherein the object information obtaining program code determines the position of the second plane using the following Equation 3:

$$d_{(o,i+1)}=1/(1/f_{(eye)}-1/d_{(i)})$$ [Equation 3]

($d_{(o,i+1)}$: distance between the i-th surface and the lens,
$f_{(eye)}$: focal length of the i-th surface,
$d_{(1)}$: threshold value of the lens-to-image).

8. The apparatus of claim 1, wherein the number of the plurality of planes is 256 or less.

9. A method for generating a hologram image corresponding to a three-dimensional object, comprising:

focusing by a lens light emitted from the three-dimensional object;

detecting the light by a sensor;

determining a confusion circle size threshold value corresponding to information of a sensor detecting the light and information of a lens focusing the light;

determining a position of a plurality of planes passing through the three-dimensional object based on the confusion circle size threshold value;

obtaining object information of the three-dimensional object of each of the plurality of planes; and generating a hologram image of the three-dimensional object based on the object information, wherein determining the position of the plurality of planes comprises:

determining a position of the first plane based on the position of the three-dimensional object;

determining a first focal length of the lens corresponding to the position of the first plane; and determining a position of at least one second plane that is different from the first plane based on the first focal length and the confusion circle size threshold value.

10. The method of claim 9, wherein determining the position of the at least one second plane comprises:

determining interval between the at least one second plane which is proportional to a distance from the lens to each second plane based on the confusion circle size threshold value, and determining the position of the at least one second plane based on the first focal length and the interval between the at least one second plane.

11. The method of claim 10, wherein determining the first focal length comprises determining the first focal length using the following Equation 1:

$$f_{(eye)}=1/(1/d_{(o,i)}+1d_{(2)})$$ [Equation 1]

$f_{(eye)}$: first focal length,
$d_{(o,i)}$: distance between the first plane and the lens,
$d_{(2)}$: distance between the lens and the sensor).

12. The method of claim 9, wherein determining the position of the at least one second plane based on the first focal length and the interval between the at least one second plane comprises:

determining a threshold value of the lens-to-image distance which is a distance between the lens and the image generated by the lens based on the confusion circle size threshold value, and determining the position of the second plane based on the first focal length and the threshold value of the lens-to-image distance.

13. The method of claim 12, wherein the determining the threshold value of the lens-to-image distance comprises determining the threshold value of the lens-to-image distance using the following Equation 2:

$$d_{(i)}=2*d_{(2)}*A/(\Delta x+2*A)$$ [Equation 2]

($d_{(i)}$ threshold value of lens-to-image distance,
$d_{(2)}$: distance between the lens and the sensor,
A: radius of the lens,
$\Delta x$ confusion circle size threshold value).

14. The method of claim 12, wherein determining the position of the second plane based on the first focal length and the threshold value of the lens-to-image distance comprises determining a position of the at least one second plane using the following Equation 3:

$$d_{(o,i+1)}=1/(1/f_{(eye)}-1/d_{(i)})$$ [Equation 3]

($d_{(o,i+1)}$: distance between the i-th surface and the lens,
$f_{(eye)}$: focal length of the i-th surface,
$d_{(1)}$: threshold value of the lens-to-image).

15. An apparatus for generating a hologram based on human visual system modeling, comprising:

a lens configured to focus light emitted from a three-dimensional object:

a sensor configured to detect the light; and one or more processors that process computer executable program code embodied in non-transitory computer readable storage media, the computer executable program code comprising:

object information obtaining program code that determines a confusion circle size threshold value corresponding to information of the sensor and information of the lens, determines a position of the three-dimensional object closest to the lens as a position of a first plane, that determines a first focal length of the lens corresponding to the position of the first plane, determines a position of at least one second plane that is different from the first plane based on the first focal length and the confusion circle size threshold value, and that obtains object information of the three-dimensional object of each of the first plane and the at least one second plane; and hologram image generating program code that generates a hologram image of the three-dimensional object based on the object information.

16. The apparatus of claim 15, wherein the object information obtaining program code determines interval between the at least one second plane which is proportional to a distance from the lens to each of the second planes based on the confusion circle size threshold value, and determines the position of the at least one second plane based on the first focal length and the interval between the at least one second plane.

17. The apparatus of claim 16, wherein the object information obtaining program code determines a threshold value of the lens-to-image distance which is a distance between the lens and the image generated by the lens based on the confusion circle size threshold value, and determines the position of the second plane based on the first focal length and the threshold value of the lens-to-image distance.

* * * * *